(12) United States Patent
Wondraczek et al.

(10) Patent No.: US 10,640,426 B2
(45) Date of Patent: May 5, 2020

(54) METHOD FOR PRODUCING A SHAPED BODY AND MOLDING

(71) Applicant: DENTSPLY SIRONA Inc., York, PA (US)

(72) Inventors: Lothar Wondraczek, Jena (DE); Lenka Muller, Jena (DE)

(73) Assignee: DENTSPLY SIRONA INC., York, PA (US)

( * ) Notice: Subject to any disclaimer, the term of this patent is extended or adjusted under 35 U.S.C. 154(b) by 329 days.

(21) Appl. No.: 15/391,238

(22) Filed: Dec. 27, 2016

(65) Prior Publication Data

US 2017/0183270 A1 Jun. 29, 2017

(30) Foreign Application Priority Data

Dec. 28, 2015 (DE) .................. 10 2015 122 857

(51) Int. Cl.
*C04B 41/45* (2006.01)
*C04B 35/634* (2006.01)
(Continued)

(52) U.S. Cl.
CPC .............. *C04B 41/457* (2013.01); *A61C 5/77* (2017.02); *A61C 13/0003* (2013.01); *A61C 13/0022* (2013.01); *B28B 3/00* (2013.01); *B28B 11/24* (2013.01); *C04B 35/48* (2013.01); *C04B 35/486* (2013.01); *C04B 35/632* (2013.01);
(Continued)

(58) Field of Classification Search
CPC ... C04B 35/48; C04B 41/457; C04B 41/5042; C04B 2235/3244; C04B 2235/616
See application file for complete search history.

(56) References Cited

U.S. PATENT DOCUMENTS 3,826,755 A * 7/1974 Scott ..................... B01J 13/006
106/460
4,612,213 A * 9/1986 Meunier ................ H01M 4/52
427/126.6
(Continued)

FOREIGN PATENT DOCUMENTS

| WO | 9947065 A1 | 9/1999 |
| WO | 2005070322 A1 | 8/2005 |
| WO | 2009146804 A1 | 12/2009 |

OTHER PUBLICATIONS

International Search Report; PCT/EP2016/082536; Mar. 10, 2017 (completed); dated Mar. 22, 2017.
(Continued)

*Primary Examiner* — Erin Snelting
(74) *Attorney, Agent, or Firm* — Dentsply Sirona Inc.

(57) ABSTRACT

The invention relates to a method for the production of a shaped body comprising at least the method steps of producing a blank having an open porosity by pressing and treating pourable material in a first heat treatment step comprising or consisting of a metal oxide, infiltrating the blank with an infiltration fluid containing a precursor of the metal oxide, precipitating hydroxide of the metal from the infiltration fluid by treating the blank with a basic solution, forming the metal oxide from the hydroxide by treating the blank in a second heat treatment step, wherein the blank is processed before or after the second heat treatment step to achieve a shape that corresponds to the shaped body.

24 Claims, 1 Drawing Sheet

(51) Int. Cl.
| | |
|---|---|
| *C04B 35/64* | (2006.01) |
| *C04B 35/636* | (2006.01) |
| *B28B 3/00* | (2006.01) |
| *C04B 35/48* | (2006.01) |
| *C04B 35/632* | (2006.01) |
| *C04B 41/50* | (2006.01) |
| *A61C 13/00* | (2006.01) |
| *C04B 35/486* | (2006.01) |
| *A61C 5/77* | (2017.01) |
| *B28B 11/24* | (2006.01) |
| *C04B 35/638* | (2006.01) |
| *C04B 35/645* | (2006.01) |
| *C04B 41/00* | (2006.01) |

(52) U.S. Cl.
CPC ........ *C04B 35/638* (2013.01); *C04B 35/6365* (2013.01); *C04B 35/63416* (2013.01); *C04B 35/63424* (2013.01); *C04B 35/63488* (2013.01); *C04B 35/64* (2013.01); *C04B 35/645* (2013.01); *C04B 41/009* (2013.01); *C04B 41/5042* (2013.01); *C04B 2235/3206* (2013.01); *C04B 2235/3217* (2013.01); *C04B 2235/3218* (2013.01); *C04B 2235/3224* (2013.01); *C04B 2235/3225* (2013.01); *C04B 2235/3229* (2013.01); *C04B 2235/3232* (2013.01); *C04B 2235/3244* (2013.01); *C04B 2235/444* (2013.01); *C04B 2235/602* (2013.01); *C04B 2235/616* (2013.01); *C04B 2235/661* (2013.01); *C04B 2235/765* (2013.01); *C04B 2235/81* (2013.01)

(56) References Cited

U.S. PATENT DOCUMENTS

| | | | | |
|---|---|---|---|---|
| 4,626,392 A * | 12/1986 | Kondo | ................... | A61L 27/427 264/643 |
| 4,851,293 A * | 7/1989 | Egerton | ................. | C01G 25/02 428/403 |
| 5,169,821 A * | 12/1992 | Soled | ..................... | B01J 21/063 502/242 |
| 5,180,696 A | 1/1993 | Inoue | | |
| 5,227,199 A * | 7/1993 | Hazlebeck | ......... | C04B 35/62847 427/376.2 |
| 5,320,675 A * | 6/1994 | Dransfield | ............. | C01G 23/02 106/450 |
| 5,478,785 A * | 12/1995 | Glass | ...................... | C04B 35/01 264/666 |
| 6,641,908 B1 * | 11/2003 | Clough | ............. | C04B 35/62805 428/307.3 |
| 8,080,189 B2 * | 12/2011 | Rothbrust | ............. | C04B 35/481 264/16 |
| 8,454,885 B2 * | 6/2013 | Dawes | .................... | C04B 35/14 264/621 |
| 9,090,511 B2 * | 7/2015 | Rothbrust | ............. | C04B 35/481 |
| 2003/0104196 A1 * | 6/2003 | Kobayashi | ................ | C03B 5/43 428/312.2 |
| 2005/0164045 A1 * | 7/2005 | Rothbrust | ............. | C04B 35/481 428/701 |
| 2005/0227864 A1 * | 10/2005 | Sutorik | ..................... | B01J 21/04 502/304 |
| 2007/0148065 A1 * | 6/2007 | Weir | ..................... | C01B 13/363 423/1 |
| 2007/0179041 A1 * | 8/2007 | Muroi | ................... | B82Y 30/00 501/103 |
| 2008/0118894 A1 * | 5/2008 | Rothbrust | ............. | C04B 35/481 433/215 |
| 2010/0173199 A1 * | 7/2010 | Hiraki | .................. | C01G 23/003 429/223 |
| 2010/0233579 A1 * | 9/2010 | Laube | .................... | C01G 25/00 429/496 |
| 2011/0254181 A1 * | 10/2011 | Holand | ................ | A61K 6/0008 264/6 |
| 2012/0040247 A1 * | 2/2012 | Manivannan | ........... | C04B 35/01 429/223 |
| 2012/0064490 A1 * | 3/2012 | Rothbrust | ............. | C04B 35/481 433/199.1 |
| 2012/0177831 A1 | 7/2012 | Dawes | | |

OTHER PUBLICATIONS

International Preliminary Report on Patentability; PCT/EP2016/082536; Apr. 23, 2018 (completed).
Written Opinion of the International Search Authority; PCT/EP2016/082536; Mar. 10, 2017 (completed); dated Mar. 22, 2017.

* cited by examiner

METHOD FOR PRODUCING A SHAPED BODY AND MOLDING

THE CROSS-REFERENCE TO RELATED APPLICATIONS

This patent application claims the benefit of and priority to German Patent Application No. 10 2015 122 857.2, filed on Dec. 28, 2015, which is herein incorporated by reference for all purposes.

TECHNICAL FIELD

The invention relates to a method for the production of a shaped body. The invention also relates to a sintered shaped body, in particular in the form of a dental restoration, such as a dental framework, crown, partial crown, bridge, cap, veneer, abutment or pin construction.

BACKGROUND

Zirconium dioxide is used in the dental sector primarily as a framework material for crowns and bridges, so that high demands are placed on the strength of the material.
WO 99/47065 A1 discloses a method for the production of a tooth replacement that can be fitted to a pre-prepared tooth stump, based on a blank of zirconium dioxide. The blank is a pre-sintered zirconium dioxide disk from which a tooth replacement of corresponding shape is derived, taking into account shrinkage behavior during the through-sintering or end-sintering. Pre-sintering is carried out at a temperature between 850° C. and 1000° C., in particular in the range 850° C. to 900° C., wherein the heat-treatment step for this is carried out for a period of time between 100 minutes and 150 minutes. An inorganic/inorganic composite material and a method for its production are known from WO 2005/070322 A1. To derive the composite material, an open-pore, crystalline oxide ceramic mold part is derived from an oxide ceramic powder of $ZrO_2$ (zirconium dioxide) following shape-providing processing and pre-sintering, with an infiltration substance applied to the said oxide ceramic mold part under vacuum at room temperature and the oxide ceramic sintered in an air atmosphere and at ambient pressure to yield the inorganic-inorganic composite material. These measures are intended to yield an improved esthetic effect.
DE 38 74 006 T2 (U.S. Pat. No. 5,180,696 A) discloses a high-toughness $ZrO_2$ sintered body having a stress-induced transformation ratio of 25% or more, which consists essentially of 40-90 volume % of $ZrO_2$ containing 0.1-3 mol % of $Nd_2O_3$ and 0.5-3.5 mol % of $Y_2O_3$ as stabilizers.
DE 10 2008 026 980 A (WO 2009/146804 A1) relates to a method for coloring porous ceramics, wherein the ceramic is treated with at least one first solution containing metal ions. In at least one further step the metal ions inserted into the ceramic for coloring are immobilized by means of a second solution by at least one chemical precipitation reaction.

SUMMARY OF THE INVENTION

Object of the present invention is to provide a method for the production of a shaped body, in particular for a dental restoration that has a high strength.
The object is achieved, inter alia, by a method to produce a shaped body, comprising at least the following method steps:

a) Production of a blank with an open porosity through pressing and treatment of pourable material in a first heat treatment step, said material containing or comprising a first metal oxide,
b) Infiltration of the blank with an infiltration fluid, which contains a precursor of the metal oxide,
c) Precipitation of hydroxide of the metal from the infiltration fluid through treatment of the blank with a basic solution,
d) Formation of metal oxide from the hydroxide through treatment of the blank in a second heat treatment step, wherein
e) the blank is processed before or after the second heat treatment step to achieve a shape corresponding to that of the shaped body.

In this case, the second heat treatment step is, in particular, the one in which the blank is completely sintered or end-sintered, or if necessary over-sintered to yield its final density. End-sintering or complete sintering means that the sintering takes place at a temperature which is known for the pourable starting material, for example, through data of the manufacturer. Over-sintering means that sintering is carried out at a higher temperature which is 5% to 10% above the temperature usually used for the end-sintering or complete sintering.
In particular, it is provided that the pourable material used is one in which the metal oxide after the second heat treatment step and cooling to room temperature contains a first stabilized crystal phase of at least 50%, in particular at least 80%, preferably at least 95% stabilized.
In particular, it is provided that a material which contains zirconium dioxide is used as the pourable material, and the blank produced therefrom has a matrix of stabilized tetragonal zirconium dioxide at room temperature.
For this purpose, the pourable material, in particular, contains in addition to zirconium dioxide, a dopant in the form of yttrium oxide ($Y_2O_3$), calcium oxide (CaO), magnesium oxide (MgO) or cerium oxide ($CeO_2$), wherein the zirconium oxide in particular contains yttrium oxide ($Y_2O_3$) in the range of 4.5 wt % to 7.0 wt %.
The pre-sintered blank is infiltrated using an infiltration fluid which is a precursor to form the metal oxide as that which also corresponds to that of the pourable material but where necessary without doping.
When zirconium dioxide is used, the zirconium dioxide embedded in the matrix of the blank is at least partially in monoclinic crystal form, which has a volume 3% to 5% higher than that of the tetragonal crystal form, i.e., the volume of the crystal form of the tetragonal zirconium dioxide is less than that of the monoclinic zirconium dioxide.
The infiltration of the blank with the infiltration fluid is preferably carried out in such a way that the blank is firstly placed in a sample chamber in which there is a negative pressure of, for example, −0.7 bar below atmospheric pressure. The blank is then placed in the infiltration fluid at this negative pressure, the fluid containing a precursor of the metal hydroxide to be formed, from which the metal dioxide is formed. The sample chamber is then vented, so that the infiltration fluid is pressed into the blank in a controlled manner. This infiltration process is carried out over a period of at least 10 to 20 minutes, preferably over a time between 25 and 50 minutes at normal pressure and preferably at room temperature.
After the infiltration and drying of the blank, the latter is then placed in a basic solution which is, for example, an $NH_4OH$ solution or an NaOH solution or another basic solution, in particular with a pH value>8. With this solution, the blank is infiltrated over a period of preferably at least 10 minutes, in particular approximately one hour, so that formation of the metal hydroxide is triggered in the pores of the blank, at room temperature. Subsequently, the blank is dried and then sintered to obtain the final density. This can be accomplished by means of so-called end-sintering or complete sintering or through over-sintering. The latter is carried out at a temperature approximately 5 to 10% above the temperature which is customarily used for complete sintering or end-sintering and is specified by manufacturers of corresponding powders to be sintered. With over-sintering, the sintering time corresponds to the manufacturer's data for the complete or end-sintering.

In particular, the blank should be infiltrated with a 45-55% $NH_4OH$ solution, preferably with a 51.5% $NH_4OH$ solution (corresponds to 25% $NH_3$ in 100 g solution), or a 15-25% NaOH solution, in particular a 20% NaOH solution.

Infiltration with the basic solution should thereby be carried out at room temperature.

In order to ensure an isotropic distribution of the metal dioxide, in particular zirconium dioxide, to be formed, the invention provides that infiltration with the basic solution is carried out over a period t of at least 10 minutes, in particular 50 minutes≤t≤70 minutes, in particular t=60 minutes.

It is then provided that, after infiltration with the basic solution, the blank is dried.

Finally, drying of the blank is followed by complete sintering or end-sintering or, if appropriate, over-sintering. In this case, the sintering should be carried out at a temperature which is 5-15% higher than the temperature at which the blank is completely sintered or end-sintered—for the same length of time as complete sintering or end-sintering.

The metal oxide, in particular zirconium dioxide, is then formed by drying and sintering, i.e., by the second heat treatment step.

Even if, as mentioned, a pourable material is preferably used, the zirconium dioxide, which is doped in a quantity to stabilize a desired crystal phase, then the invention is also at least one metal oxide powder from the group comprising $Al_2O_3$, $TiO_2$, $CeO_2$, MgO, $Y_2O_3$ and zirconium oxide mixed crystal $$Zr_{1-x}Me_xO_2\left(\frac{4n}{2}\right)_x$$

is used in the pourable material, wherein Me is a metal that in oxide form is present as a divalent, trivalent or tetravalent cation (n=2, 3, 4 and 0≤x≤1) and stabilizes the tetragonal and/or the cubic phase of the zirconium dioxide.

In particular, it is provided that the bulk material used is one that contains at least one powder containing the metal oxide and at least one organic binder, preferably of at least one of the classes polyvinyl alcohols (PVA), polyacrylic acids (PAA), celluloses, polyethylene glycols and/or thermoplastics.

A binder with a percentage in the range 0.1 to 45 vol %, preferably in the range 0.1 to 5 vol %, should thereby be used.

As the infiltration fluid, in particular, a sol or precursor is used which contains deionized water and an oxychloride of the zirconium, e.g., $ZrOCl_2$, polyhalogenated zirconates or basic zirconium chloride.

Furthermore, particularly good results are obtained if the fluid used as the infiltration fluid has at process temperature a dynamic viscosity η of 3.5 mPa·s≤η≤4.0 mPa·s, in particular η=3.9 mPa·s±0.1 mPa·s.

As a result of these measures, in particular also through the duration of the infiltration and the pressure with which the infiltration fluid is pressed into the blank, the blank is isotropically permeated by the infiltration fluid so that the metal oxide, such as zirconium oxide, precipitated in the matrix of the blank is uniformly distributed and the pores surrounded by the matrix are filled by the oxide. This results in an increase in strength compared to shaped bodies in which the blanks are not exposed to a corresponding vacuum infiltration process.

If, furthermore, an infiltration fluid is used, wherein zirconium dioxide is formed without doping or with very little doping, thus having a monoclinic crystal phase at room temperature, the larger volume of the crystals of the embedded monoclinic zirconium dioxide results in a pressure action on the tetragonal zirconium dioxide-containing matrix with the result that a further increase in strength can be achieved.

DETAILED DESCRIPTION OF THE INVENTION

Figure 1:
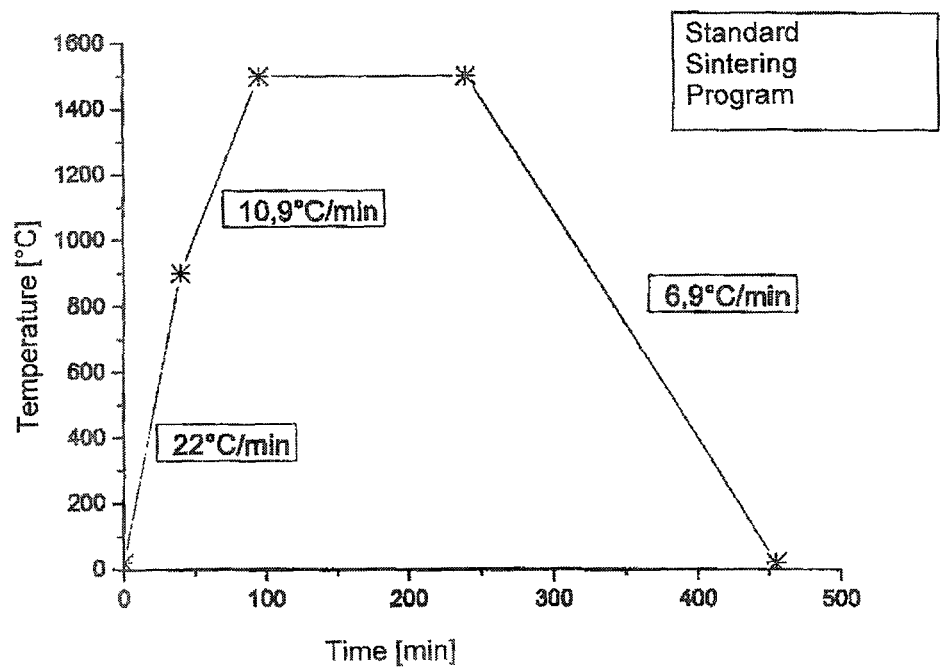
FIG. 1 shows a process sequence for a standard sintering program according to the present invention.

By means of the teaching according to the invention, a shaped body is provided which has a higher strength compared to those which are not subjected to vacuum infiltration in accordance with the teaching of the invention. This is up to 58% higher.

The strength increase is likely to be due to the sealing of the pores and inhomogeneity (e.g., cracks) in the blank. However, different volumes of the crystal phases as well as the intrinsic stress of the structure are also likely to contribute to the strength increase.

The invention is in particular characterized by a sintered shaped body, in particular in the form of a dental restoration, such as a dental framework, a crown, a partial crown, a bridge, a cap, a veneer, an abutment or a pin construction, wherein the body comprises first particles of zirconium dioxide ($ZrO_2$), or containing zirconium dioxide, bound through sintering, as a metal oxide and second particles of or containing $ZrO_2$ present between the first particles. It is characteristic of the shaped body that the shaped body consists of an open-pore matrix formed by the first particles and of pores of the matrix filled by the second particles, the first particles having a predominantly tetragonal phase component, and the second particles having a second crystal phase in part differing from the tetragonal phase and that the shaped body has a bending strength σ≥1000 MPa.

The shaped body according to the invention is characterized by a much higher bending strength, determined according to DIN ISO 6872, compared to those in which the pores are not filled by a metal oxide corresponding to the matrix. The increase in strength is likely to be due not just to the filling of the pores but also to the fact that the metal oxide embedded in the pores has a crystal shape which deviates in terms of volume from the tetragonal crystal form in the matrix and is greater. This is particularly noticeable if the matrix consisting of, or containing, zirconium dioxide, has a tetragonal phase component of more than 80%, preferably more than 90%, in particular more than 95%.

The embedded zirconium dioxide should have a monoclinic phase percentage of at least 50%.

However, there is no departure from the invention even if the zirconium dioxide which is incorporated is likewise doped, i.e., has a substantially tetragonal crystal form; filling the pores with the metal oxide leads to an increase in strength.

According to the invention, a shaped body is provided which consists of, or contains, a first metal oxide forming a matrix into which a metal oxide of the same or different chemical composition is incorporated, which in turn has a crystal shape with a volume which is greater than the volume of the crystal form of the first metal oxide forming the matrix or contained in the matrix.

Further details, advantages and features of the invention result not only from the claims, the features to be derived from these—separately and/or in combination-, but also from the following description of preferred example embodiments.

To facilitate comparative tests, at 900° C. pre-sintered tetragonal stabilized zirconium dioxide disks each having a thickness of 2 mm and a diameter of 24.8 mm were used.

Each zirconium dioxide ($ZrO_2$) disk comprises in % by weight:

$HfO_2$<3.0
$Al_2O_3$≤0.3
Technically necessary, unavoidable components≤0.2 (such as $SiO_2$, $F_2O_3$, $Na_2O$)
$Y_2O_3$ 4.5 to 7.0
Color-imparting oxides:0-1.5

$$ZrO_2=100-(Y_2O_3+Al_2O_3+HfO_2+\text{unavoidable}+\text{color-imparting oxides})$$

Bending strength measurements according to DIN EN ISO 6872 were carried out on these discs or specimens as blanks, after infiltration where necessary, after the specimens have been densely or finely sintered or over-sintered in the following manner.

Some of the samples were previously subjected to a vacuum infiltration process according to the teaching of the invention.

For this purpose a sol or precursor of 70 g $ZrOCl_2 \cdot 8H_2O$ per 100 ml solution was prepared as the infiltration fluid, with deionized water used as the solvent.

As a result, a viscosity of the infiltration fluid of 3.89 MPa·s could be achieved, whereby it was insured that the blank was uniformly penetrated by the infiltration fluid and was distributed isotropically after infiltration with the basic solution zirconium dioxide was precipitated.

Some of the pre-sintered porous blanks were then evacuated in a vacuum infiltration system, Cast N'Vac 1000 (Buehler) for 20 minutes, whereby a pressure of −0.7 bar relative to atmospheric pressure was attained. The blanks were then held in the sol/precursor (infiltration fluid) while maintaining a negative pressure to carry out infiltration. After this immersion, the negative pressure was maintained for a further 5 minutes, with subsequent ventilation by means of a pressure valve. By opening the valve, the infiltration fluid is pressed into the porous specimens. The specimens i.e., blanks were then held in the infiltration fluid at atmospheric pressure for 25 minutes (infiltration time). The infiltration was carried out at room temperature. After removal from the infiltration fluid, the blanks were dried in a heating cabinet at 50° C. for 5 minutes.

Some of the dried samples were then placed in a 51.5% $NH_4OH$ solution (reactant) (corresponds to 25% $NH_3$ in 100 g solution) and infiltrated at room temperature over a period of 60 minutes.

The infiltrated blanks were then dried again for 5 minutes at 50° C. and finally sintered.

Infiltration with the sol/precursor and subsequent infiltration with the $NH_4OH$ solution leads to the following simplified reaction proceeds (ammonium hydroxide route):

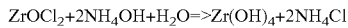

Subsequent drying and sintering leads to the formation of zirconium dioxide according to the following reaction equation:

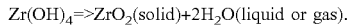

Alternatively, some samples, which were previously infiltrated with the infiltration fluid as explained above and then dried, were infiltrated with a twenty percent NaOH solution (reactant) for one hour, also at room temperature. This was followed by drying and sintering. The following reactions proceed through the so-called sodium hydroxide route (again simplified):

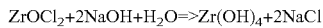

and

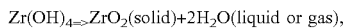

wherein the last reaction is determined through drying and sintering.

The sintering, carried out after infiltration with the basic solution (NaOH or $NH_4OH$) and drying, generally referred to as end-sintering or complete sintering, was carried out according to the standard sintering program for the blanks, which is shown in FIG. 1.

Figure 2:
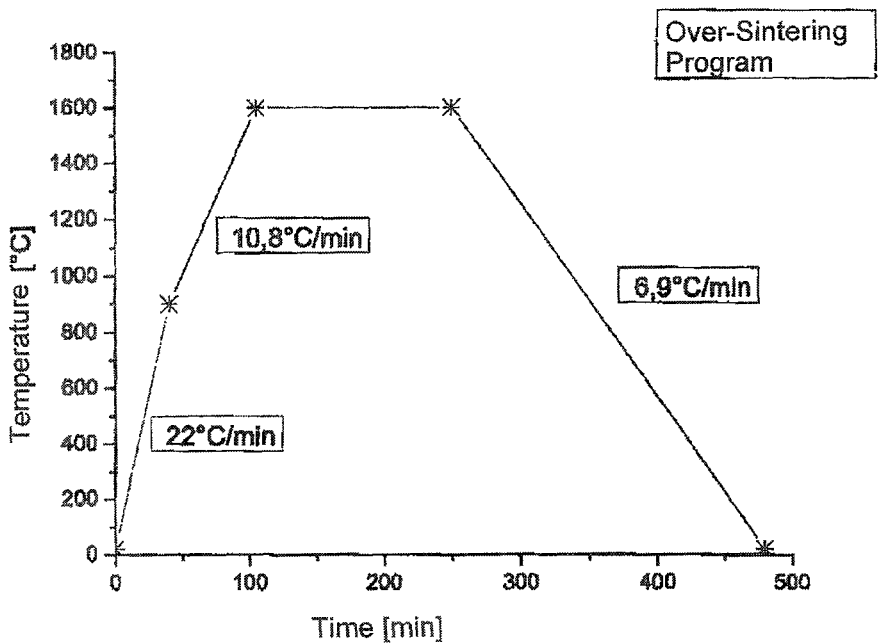
FIG. 2 shows a process sequence for an over-sintering program according to the present invention.

Some of the samples were over-sintered, i.e., at a temperature approximately 100° C. above that which the manufacturer of the blanks specifies for end-sintering or complete sintering. The process sequence for over-sintering is shown in FIG. 2. It can be seen that the duration of the over-sintering at maximum temperature corresponds to that of complete sintering or end-sintering (FIG. 1).

Biaxial bending tests were then carried out, both for blanks which were not subjected to the vacuum infiltration process (reference samples), as well as blanks infiltrated by the sodium hydroxide route and ammonium hydroxide route. The measurements were carried out in accordance with DIN EN ISO 6872 (Dentistry Ceramic Materials). For determination of the biaxial bending strength, the samples were placed on three hardened steel spheres. These were arranged in a circle with a radius of 6 mm (radius of support circle). The fourth contact point was created by the force-transferring fracture tool (radius of the upper stamp: 0.70 mm). A bending test machine Z020 and the associated software TestXpert II (Zwick GmbH and Co. KG, Germany) were used. The initial force was 2 N and the velocity of the initial force 5 mm/minute. The test speed of 1 mm/minute corresponded to that given in DIN EN ISO 6872.

The biaxial bending tests were carried out on 30 samples which were infiltrated by the ammonium hydroxide route and on 30 reference samples, i.e., blanks, which were not infiltrated.

The mean bending strength value of the reference samples sintered with the standard sintering program (FIG. 1) was 736 MPa, with a standard deviation of 95.9 MPa, a Weibull modulus of 9.2 and a Weibull strength of 777 MPa. The mean bending strength value of the samples of the ammonium hydroxide route was 1087 MPa, with a standard deviation of 119.6 MPa, a Weibull modulus of 10.9 and a Weibull strength of 1137 MPa.

The biaxial bending test of the reference samples sintered with the sintering program "over-sintering" (FIG. 2) yielded a mean bending strength value of 878 MPa, a standard deviation of 95.8 MPa, a Weibull modulus of 11.1 and a Weibull strength of 918 MPa. The mean bending strength of the over-sintered samples of the ammonium hydroxide route was 1144 MPa, with a standard deviation of 263.8 MPa, a Weibull modulus of 4.5 and a Weibull strength of 1258 MPa.

The tests of blanks infiltrated by the sodium hydroxide route yielded strength values corresponding to those of the ammonium hydroxide route.

A comparison of the numerical values shows that with the standard sintering program, the mean bending strength value was 48% higher than that of the reference samples when the ammonium hydroxide route was selected. The Weibull strength was increased by 46%.

In order to produce a shaped body, in particular a dental shaped body, such as a dental restoration, in particular a dental framework, crown, partial crown, cap, veneer, abutment or pin construction, the blank is in principle machined before the end-sintering or over-sintering process, in particular by milling. In this case, the shrinkage resulting from the complete sintering or end-sintering/over-sintering must be taken into account. Alternatively, machining can also be carried out after the sintering process.

The invention claimed is:

1. A method for production of a shaped body, comprising the steps of:
   a) producing a blank having an open porosity through pressing and treatment of a pourable material in a first heat treatment step, the pourable material including a metal dioxide,
   b) infiltrating the blank with an infiltration fluid, which includes a precursor of the metal dioxide,
   c) precipitating a hydroxide of the metal dioxide from the infiltration fluid by treatment of the blank with a basic solution,
   d) forming the metal dioxide from the hydroxide through treatment of the blank in a second heat treatment step, and
   e) processing the blank before or after the second heat treatment step to achieve a shape corresponding to the shaped body.

2. The method according to claim 1, wherein the second heat treatment step is carried out by sintering of the blank.

3. The method according to claim 1, wherein the metal dioxide embedded in the blank at room temperature after the second heat treatment has a first stabilized crystal phase of at least 50%.

4. The method according to claim 3, wherein the infiltration fluid is such that the metal dioxide formed from the hydroxide has a second crystal phase that differs from the stabilized first crystal phase.

5. The method according to claim 4, wherein the crystals of the second crystal phase have a greater volume than the crystals of the first crystal phase.

6. The method according to claim 1, wherein a tetragonal stabilized zirconium dioxide is used as the metal dioxide of the blank.

7. The method according to claim 1, wherein the pourable material further includes at least one metal oxide powder being selected from the group consisting of $Al_2O_3$, $TiO_2$, $CeO_2$, $MgO$, $Y_2O_3$, and a zirconium dioxide mix crystal of the formula:

$$Zr_{1-x}Me_xO_{2(4n/2)x},$$

wherein Me is a metal which in oxide form is present as a bivalent, trivalent or tetravalent cation (n=2, 3, 4 and $0 \leq x \leq 1$) and stabilizes a tetragonal and/or cubic phase of the zirconium dioxide.

8. The method according to claim 1, wherein the pourable material is one that includes at least one powder containing the metal dioxide as well as at least one organic binder selected from the group consisting of classes of polyvinyl-alcohols (PVA), polyacrylic acids (PAA), celluloses, polyethyleneglycols, thermoplasts and mixtures thereof.

9. The method according to claim 8, wherein a binder with a percentage in the range 0.1 to 45 vol % is used.

10. The method according to claim 1, wherein the pourable material used is one that includes a zirconium dioxide doped with yttrium oxide ($Y_2O_3$), calcium oxide (CaO), magnesium oxide (MgO) and/or cerium oxide ($CeO_2$) and at room temperature the zirconium dioxide is stabilized in the cubic and/or tetragonal crystal form.

11. The method according to claim 1, wherein the infiltration fluid is one in which the metal dioxide formed from the hydroxide after method step d) is monoclinic zirconium dioxide or includes monoclinic zirconium dioxide.

12. The method according to claim 1, wherein a solution or a precursor is used as the infiltration fluid and includes deionized water and an oxychloride of zirconium.

13. The method according to claim 1, wherein the infiltration fluid used for the step of infiltration has a dynamic viscosity $\eta$ of 3.5 MPa·s$\leq \eta \leq$4.0 MPa·s.

14. The method according to claim 1, wherein the blank is immersed in the infiltration fluid for a period of time t, where t>10 minutes.

15. The method according to claim 1, wherein the blank is penetrated isotropically by the infiltration fluid.

16. The method according to claim 1, wherein for the step of infiltration, the blank is arranged in a negative pressure atmosphere, is then immersed in the infiltration fluid at negative pressure, and is subsequently exposed to atmospheric pressure.

17. The method according to claim 1, wherein after the step of infiltration, the blank is dried with the infiltration fluid.

18. The method according to claim 1, wherein after the step of infiltrating, the blank is dried and then contacted with the basic solution.

19. The method according to claim 18, wherein the basic solution is selected from the group consisting of a 45-55% $NH_4OH$ solution and a 15-25% NaOH solution.

20. The method according to claim 18, wherein during the step of precipitating, the blank is contacted with the basic solution is at room temperature.

21. The method according to claim 18, wherein during the step of precipitating, the blank is contacted with the basic solution for a period of time t where t$\geq$10 minutes.

22. The method according to claim 18, wherein after the step of infiltration, the blank is dried.

23. The method according to claim 22, wherein after drying of the blank from the precipitating step, the blank is completely sintered, end-sintered or over-sintered.

24. The method according to claim 23, wherein over-sintering is at a temperature that is 5-15% higher than a temperature at which the blank is completely sintered or end-sintered.

* * * * *